(12) United States Patent
Tatehata et al.

(10) Patent No.: US 9,023,514 B2
(45) Date of Patent: May 5, 2015

(54) BATTERY PACK

(75) Inventors: Shoji Tatehata, Fukushima (JP);
Hideyuki Suzuki, Fukushima (JP)

(73) Assignee: Sony Corporation, Tokyo (JP)

( * ) Notice: Subject to any disclaimer, the term of this patent is extended or adjusted under 35 U.S.C. 154(b) by 332 days.

(21) Appl. No.: 13/514,653

(22) PCT Filed: Dec. 21, 2010

(86) PCT No.: PCT/JP2010/007388
§ 371 (c)(1),
(2), (4) Date: Jun. 8, 2012

(87) PCT Pub. No.: WO2011/080891
PCT Pub. Date: Jul. 7, 2011

(65) Prior Publication Data
US 2012/0237801 A1  Sep. 20, 2012

(30) Foreign Application Priority Data
Dec. 29, 2009  (JP) .................................. 2009-299187

(51) Int. Cl.
*H01M 2/02* (2006.01)
*H01M 2/30* (2006.01)
*H01M 2/10* (2006.01)

(52) U.S. Cl.
CPC .............. *H01M 2/30* (2013.01); *H01M 2/0215* (2013.01); *H01M 2/1027* (2013.01); *H01M 2/1061* (2013.01)

(58) Field of Classification Search
CPC .... H01M 2/30; H01M 2/0207; H01M 2/0215
USPC .................................. 429/178, 179, 163, 162
See application file for complete search history.

(56) References Cited

U.S. PATENT DOCUMENTS

2007/0037046 A1* 2/2007 Takahashi et al. .............. 429/96
2007/0275297 A1* 11/2007 Osada et al. .................... 429/61
2012/0148912 A1  6/2012 Hara et al.

FOREIGN PATENT DOCUMENTS

| CN | 1499654 A | 5/2004 |
|---|---|---|
| JP | 2001-307694 A | 11/2001 |
| JP | 2002-164028 A | 6/2002 |

(Continued)

*Primary Examiner* — Jane Rhee
(74) *Attorney, Agent, or Firm* — Wolf, Greenfield & Sacks, P.C.

(57) ABSTRACT

[Object] To prevent elements in a pack main body and an electronic apparatus from malfunctioning even if the pack main body having an outer shape line-symmetric in up and down directions and left- and right-hand directions is incorrectly attached.
[Solving Means] There are provided a pack main body 11 installing the battery cell 29 and a terminal portion 12 constituted of a plus terminal 12a, a minus terminal 12b, and a control terminal 12c that are provided on a front surface 11c of the pack main body 11. The plus terminal 12a, the minus terminal 12b, and the control terminal 12c are provided so as to be deviated to one end portion 11f in a width direction of the front surface 11c and arranged in an order of the plus terminal 12a, the control terminal 12c, and the minus terminal 12b. The sizes of the control terminal 12c, the plus terminal 12a, and the minus terminal 12b are increased in an order of the control terminal 12c, the plus terminal 12a, and the minus terminal 12b such that the control terminal 12c is formed to be the smallest. While being attachable to various electronic apparatuses, the pack main body can ensure a sufficient mechanical strength.

26 Claims, 9 Drawing Sheets

(56) References Cited

FOREIGN PATENT DOCUMENTS

| JP | 2004-165134 A | 6/2004 |
| JP | 2004-319144 A | 11/2004 |
| JP | 2006-253084 A | 9/2006 |
| JP | 2007-048723 A | 2/2007 |
| JP | 2009-301931 A | 12/2009 |

* cited by examiner

BATTERY PACK

CROSS REFERENCE TO RELATED APPLICATIONS

This application is a U.S. National Stage application under 35 U.S.C. §371, based on International Application No. PCT/JP2010/007388, filed Dec. 21, 2010, which claims priority to Japanese Patent Application No. 2009-299187, filed Dec. 29, 2009, each of which is hereby incorporated by reference in its entirety.

TECHNICAL FIELD

The present invention relates to a battery pack attachable to a plurality of electronic apparatuses.

BACKGROUND ART

To a small electronic apparatus such as a digital still camera, a digital video camera, or a cellular phone, a battery pack for a lithium-ion secondary battery or the like is detachably attached. In the existing electronic apparatuses, battery packs are often prepared for each model and thus arrangement of terminals in a battery attachment portion varies depending on the model of the electronic apparatus. Although for example, in general, the terminals in the battery attachment portion are often arranged in an order of a plus terminal, a control terminal, and a minus terminal, their intervals or the like are different depending on the kind thereof. Thus, there are many cases where the battery pack corresponding to each electronic apparatus is not excellent in general use and cannot be attached to various electronic apparatuses irrespective of the kind of the electronic apparatus.

Further, the battery pack is detached from the battery attachment portion for charging or the like. Then, the user may accidentally drop the battery pack when attaching or detaching the battery pack to/from the electronic apparatus. Thus, the battery pack also needs a mechanical strength enough to withstand a dropping impact.

CITED DOCUMENTS

Patent Document

Patent Document 1: Japanese Patent Application Laid-open No. 2009-176486

DISCLOSURE OF THE INVENTION

Problem to be Solved by the Invention

In view of the above-mentioned problems, it is an object of the present invention to provide a battery pack attachable to various electronic apparatuses and capable of ensuring a sufficient mechanical strength.

Means for Solving the Problem

A battery pack according to the present invention includes a pack main body installing a battery cell, a terminal portion constituted of a plus terminal, a minus terminal, and a control terminal that are provided on a front surface of the pack main body, and a window frame portion provided with terminal windows through which the plus terminal, the minus terminal, and the control terminal are exposed to an outside. The plus terminal, the minus terminal, and the control terminal are provided to be deviated to one end portion side in a width direction of the front surface and arranged in an order of the plus terminal, the control terminal, and the minus terminal from the one end portion side. Further, the sizes of the terminals which are exposed through the window frame portion are increased in an order of the control terminal, the plus terminal, and the minus terminal such that the control terminal is formed to be the smallest.

Effects of the Invention

According to the present invention, the plus terminal, the minus terminal, and the control terminal are provided to be deviated to one end portion side in the width direction of the front surface of the pack main body and arranged in an order of the plus terminal, the control terminal, and the minus terminal from the one end portion side. Further, the sizes of the terminals which are exposed through the window frame portion are increased in an order of the control terminal, the plus terminal, and the minus terminal such that the control terminal is formed to be the smallest. In the present invention, by setting the terminals to have different sizes, while being attachable to various electronic apparatuses, the battery pack can ensure a sufficient mechanical strength.

BEST MODE(S) FOR CARRYING OUT THE INVENTION

Hereinafter, a battery pack to which the present invention is applied will be described with reference to the drawings. It should be noted that in the section of "Best Mode(s) for Carrying Out the Invention," an application example of the present invention will be described in the following order.

(1) Description of Digital Still Camera
(2) Description of Battery Pack
(2-1) Configuration of Battery Pack
(2-2) Assembly of Battery Pack
(2-3) Action of Battery Pack
(3) Modified Example

(1) Description Of Digital Still Camera

Figure 1:
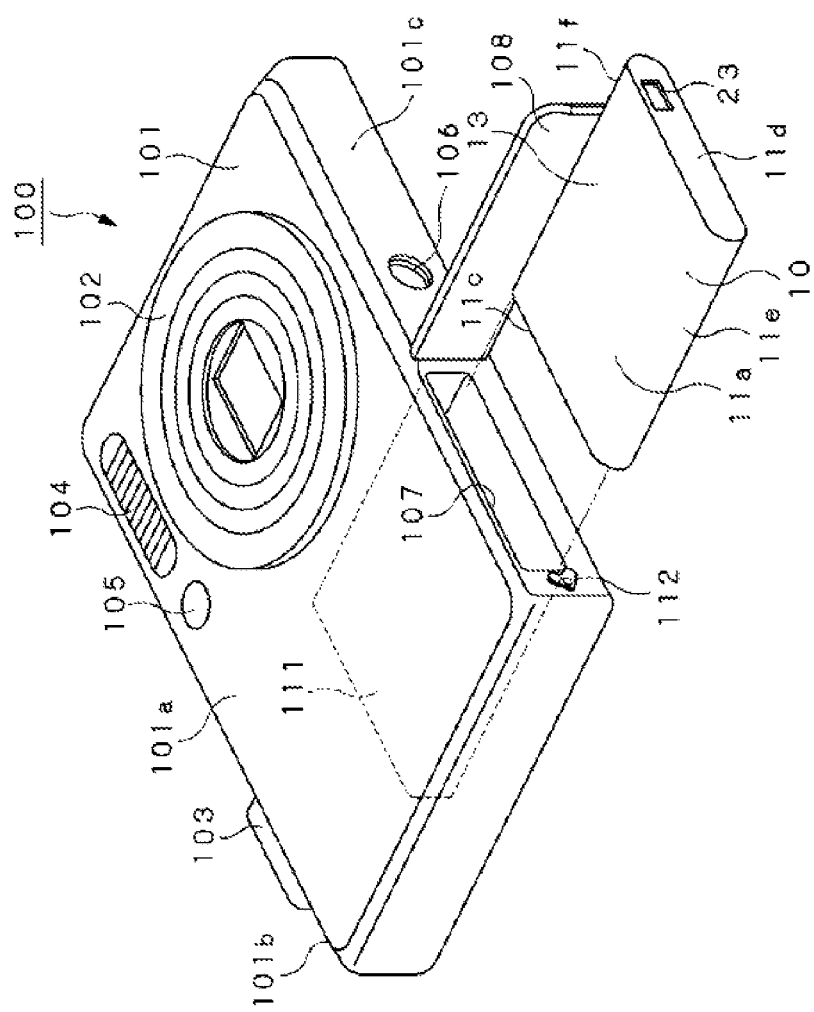
[FIG. 1] A perspective view showing a state in which a battery pack to which the present invention is applied is attached to a digital still camera.

As shown in FIG. 1, a battery pack 10 to which the present invention is applied is attached to a digital still camera 100 being an electronic apparatus. The digital still camera 100 includes a thin camera main body 101 having a substantially rectangular shape. In a front surface 101a of the digital still camera 100, a lens portion 102 installing a plurality of lens groups such as a zoom lens and a collecting lens is provided. Further, in one corner portion of an upper surface 101b of the camera main body 101, a release button 103 that is pressed for photographing a subject is provided. Further, on the upper surface 101b side in the front surface 101a of the camera main body 101, a light-emitting portion 104 that emits the light for flash photography is provided. Adjacent to the light-emitting portion 104, a window portion 105 being a finder is provided. In a substantially center portion in a width direction of a lower surface 101c of the camera main body 101, an attachment portion 106 for attaching a tripod or the like is provided.

In the lower surface 101c of the camera main body 101, a battery insertion port 107 having a substantially rectangular shape for housing the battery pack 10 and having substantially the same size and shape as those of the front surface of the battery pack 10 is provided. In addition, in the lower surface 101c of the camera main body 101, a battery lid 108 that opens and closes the battery insertion port 107 is provided. In the camera main body 101, a battery attachment portion 111 is provided to be continuous with the battery insertion port 107. In vicinity of the battery insertion port 107, a lock member 112 for holding the battery pack 10 attached to the battery attachment portion 111 in an attachment position is provided. The lock member 112 is engaged to a corner portion of a back surface 11d of the battery pack 10 urged in an ejection direction due to a spring pressure in electrical contacts and an ejection spring when the battery pack 10 is attached to the battery attachment portion 111, to thereby prevent the battery pack 10 from dropping out of the battery attachment portion 111. Specifically, the lock member 112 is provided in vicinity of the battery insertion port 107 so as to be rotatable. When a tip portion of the lock member 112 is placed on the battery insertion port 107 by rotation operation, the lock member 112 is engaged to the corner portion of the back surface 11d of the battery pack 10 attached to the battery attachment portion 111. With this, the lock member 112 prevents the battery pack 10 from being ejected through the battery insertion port 107 from the battery attachment portion 111 due to the spring pressure in the electrical contacts or the spring pressure of the ejection spring.

It should be noted that in order to detach the battery pack 10 from the battery attachment portion 111, the lock member 112 only needs to be rotated to be retracted from the battery insertion port 107 so that the engagement state between the corner portion of the back surface of the battery pack 10 and the lock member 112 is released. With this, the battery pack 10 automatically projects and is ejected through the battery insertion port 107 due to the spring pressure in the electrical contacts or the spring pressure of the ejection spring.

(2) Description Of Battery Pack

As the battery pack 10 that is inserted through the battery insertion port 107, is attached to the battery attachment portion 111, and supplies power to the camera main body 101, for example, a lithium-ion polymer secondary battery is used.

(2-1) Configuration of Battery Pack

Figure 2:
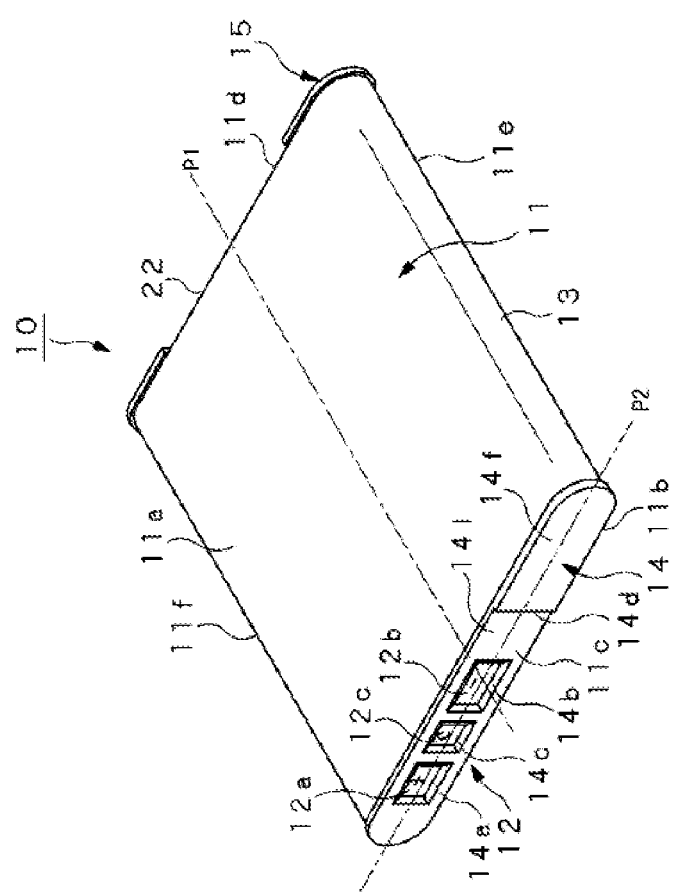
[FIG. 2] A perspective view of the battery pack to which the present invention is applied as viewed from an upper front side.
Figure 3:
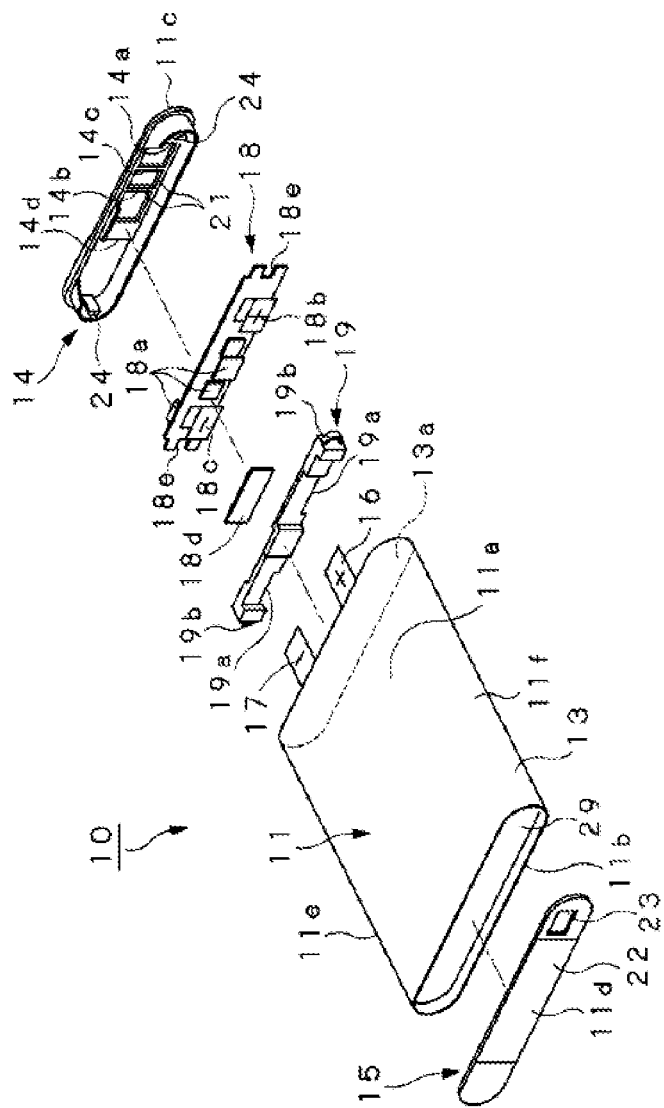
[FIG. 3] An exploded perspective view of the battery pack to which the present invention is applied.

The battery pack 10 includes, as shown in FIGS. 2 and 3, a pack main body 11 installing therein a battery cell 29 of the lithium-ion polymer secondary battery. The pack main body 11 is formed to generally have a substantially-rectangular and flat shape and to include an upper surface 11a and a lower surface 11b that are plane. A front surface 11c and a back surface 11d are formed to each include a step portion, although a surface formed in each step portion is plane. Further, both side surfaces 11e and 11f are formed of circular arcs projecting to the outside. In other words, the pack main body 11 has substantially the same thickness from the front surface 11c to the back surface 11d. Additionally, the pack main body 11 is formed to be line-symmetric with respect to a centerline P1 in the width direction and to be also substantially line-symmetric with respect to a centerline P2 in a thickness direction as viewed from the front surface 11c side, the front surface 11c being a terminal arrangement surface to which the terminal portion 12 is provided.

The front surface 11c of the pack main body 11 is used as an insertion end to the battery insertion port 107 of the digital still camera 100. In the front surface 11c, the terminal portion 12 is provided. The terminal portion 12 is electrically connected when brought into press-contact with the electrical contacts formed in a bottom surface of the battery attachment portion 111. Thus, for example, even if the battery pack 10 is inserted into the battery insertion port 107 with the upper surface 11a and the lower surface 11b being in reverse directions, that is, back to front, the battery pack 10 can be easily detached from the battery attachment portion 111.

The battery pack 10 is formed such that a plus terminal 12a, a minus terminal 12b, and a control terminal 12c constituting the terminal portion 12 in the front surface 11c of the pack main body 11 have different sizes. With this, in the battery pack 10, it becomes possible that the terminals 12a to 12c are brought into contact with not only the electrical contacts in the battery attachment portion 111 of the digital still camera 100, but also electrical contacts in a battery attachment portion of a digital still camera of a different model. In addition, the terminals 12a to 12c of the battery pack 10 is also brought into contact with electrical contacts in a battery attachment portion of a different electronic apparatus.

The pack main body 11 includes, as shown in FIG. 3, a can main body 13 generally having a substantially-rectangular and flat-tube shape. By providing a resin layer of nylon or the like on a surface of metal material such as aluminum, the can main body 13 achieves electrical insulation in the surface and surface protection. Further, regarding an inner surface of the pack main body 11, by providing a resin layer excellent in insulation and bending property, which is formed of polypropylene or the like, on this inner surface, it is possible to thermally weld a top cover 14 and a bottom cover 15 that closes the front-surface-side opening portion 13a and the back-surface-side opening portion 13b that are opened in the can main body 13. In the can main body 13, the battery cell 29 being the lithium polymer secondary battery is loaded and a plus lead terminal 16 and a minus lead terminal 17 are introduced from the front-surface-side opening portion 13a side.

Regarding the front-surface-side opening portion 13a into which the plus lead terminal 16 and the minus lead terminal 17 are introduced, as shown in FIG. 3, the wiring substrate 18 is incorporated in a holder 19 and the holder 19 with the wiring substrate 18 being incorporated therein is inserted through the front-surface-side opening portion 13a. The wiring substrate 18 held by the holder 19 incorporated in the front-surface-side opening portion 13a is covered with the top cover 14.

Here, the wiring substrate 18 is a rigid printed wiring substrate having substantially the same shape and size as those of the front-surface-side opening portion 13a. On one surface on the holder 19 side, and further, the other surface on the opposite side of the wiring substrate 18, a plurality of electronic components 18a are mounted. Specifically, on each surface of the wiring substrate 18, as electronic components 18a, a protection element on which a protection circuit for the battery cell 29 is formed, a microcomputer for performing a data communication of, for example, sending battery charge data to the electronic apparatus (e.g., digital still camera 100) attached thereto, an FET element (Field Effect Transistor) that performs a charge control, and the like are mounted. Further, the wiring substrate is provided with a plus tab 18b and a minus tab 18c. To the plus tab 18b, the plus lead terminal 16 introduced from the battery cell 29 is fixed by welding such as resistance welding. Further, to the minus tab 18c, via a PTC (Positive Temperature Coefficient) 18d, the minus lead terminal 17 is fixed by welding such as resistance welding. It should be noted that the resistance of the PTC 18d is rapidly increased when the temperature of the battery cell 29 is increased with respect to a setting temperature, so that a current flowing in the battery cell 29 is substantially shut off.

As described above, the wiring substrate 18 including the surfaces on which the electronic components are mounted and including the lead terminals 16 and 17 fixed thereto is, as shown in FIG. 3, positioned and attached to one surface, that is, surface on an opposite side to the battery cell 29, of the holder 19. The holder 19 is formed to be capable of fitting into the front-surface-side opening portion 13a of the can main body 13. In one long side of the holder 19, cutouts 19a for passing the plus lead terminal 16 and the minus lead terminal 17 therethrough to one surface to which the wiring substrate 18 is fixed are formed. The holder 19 is formed of, for example, resin material such as polypropylene. After assembled into the top cover 14, the holder 19 is fitted into the front-surface-side opening portion 13a of the can main body 13 and fixed by thermal welding together with the top cover 14.

Figure 5:
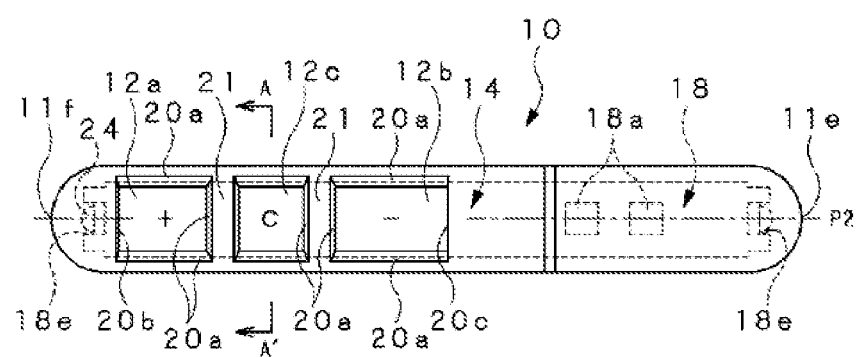
[FIG. 5] A front view of the battery pack to which the present invention is applied.

As shown in FIGS. 3 and 5, on the other surface, that is, surface on the top cover 14 side, of the wiring substrate 18, three terminals of the plus terminal 12a, the minus terminal 12b, and the control terminal 12c that become the terminal portion 12 are formed. The plus terminal 12a is connected to the plus lead terminal 16 and the minus terminal 12b is connected to the minus lead terminal 17. Further, the control terminal 12c is connected to the microcomputer arranged on the wiring substrate 18 and outputs data output from the microcomputer to an external device to which the battery pack 10 is attached. Specifically, those three terminals 12a to 12c are arranged and provided in one row on the centerline P2 in the thickness direction. The three terminals 12a to 12c are provided in equal intervals in an order of the plus terminal 12a, the control terminal 12c, and the minus terminal 12b from the side surface 11f on one end portion side of the pack main body 11. The three terminals 12a to 12c are formed to be generally deviated to the side surface 11f side on the one end portion side of the pack main body 11.

Here, regarding the sizes of the three terminals 12a to 12c, these are increased in an order of the control terminal 12c, the plus terminal 12a, and the minus terminal 12b so that the control terminal 12c is formed to be the smallest. It is necessary for the plus terminal 12a and the minus terminal 12b to ensure stable power supply and a low resistance with respect to the digital still camera 100, and for this reason, the plus terminal 12a and the minus terminal 12b are formed to be larger than the control terminal 12c. The control terminal 12c is a terminal designed for communication with the digital still camera 100, and hence the control terminal 12c only needs to have a single contact. Therefore, the control terminal 12c is formed to be the smallest. The control terminal 12c is the smallest terminal, and hence becomes a reference for positioning the three terminals 12a to 12c in the front surface 11c of the pack main body 11.

Further, although the plus terminal 12a and the minus terminal 12b are larger than the control terminal 12c, specifically, comparing the size of the plus terminal 12a with the size of the minus terminal 12b, the minus terminal 12b is larger than the plus terminal 12a. The plus terminal 12a is provided to be the closest to the side surface 11f on the one end portion side of the pack main body 11, and thus, it is a portion likely to bump against the digital still camera 100, for example, when the battery pack 10 is attached or detached. Although there is a case where a casing of the digital still camera 100 is a GND, in this case, if the plus terminal 12a bumps against the casing of the digital still camera 100 that is the GND, there is a fear that a short circuit occurs. Further, when the position of the control terminal 12c is used as the reference, the plus terminal 12a is positioned on the side surface 11f side on the one end portion side of the pack main body 11, and hence the control terminal 12c cannot be infinitely increased in size due to arrangement limitation. Further, when the plus terminal 12a is set to be as large as the minus terminal 12b and is increased in size, the mechanical strength in the corner of the top cover 14 is lowered. In view of this, the plus terminal 12a is formed to be smaller than the minus terminal 12b.

Figure 4:
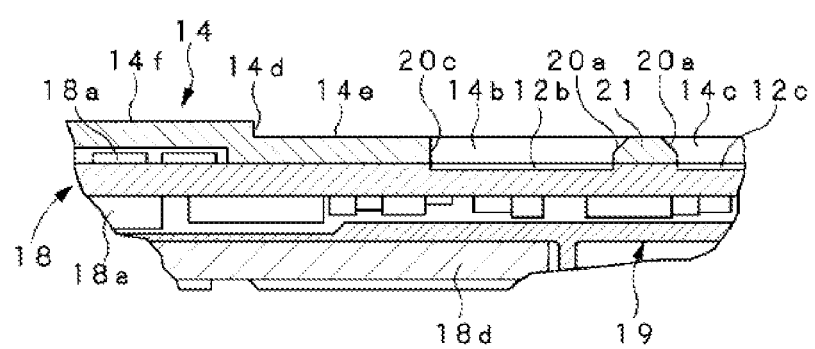
[FIG. 4] A cross-sectional view of a front side of the battery pack to which the present invention is applied.

The other surface of the wiring substrate 18 on which the above-mentioned terminals 12a to 12c are provided is covered with the above-mentioned top cover 14 as shown in FIGS. 3 to 5. The top cover 14 is formed to be capable of fitting into and closing the front-surface-side opening portion 13a of the can main body 13 and constitutes the front surface 11c of the pack main body 11. The top cover 14 is formed of, for example, resin material such as polypropylene. The top cover 14 is fitted into the front-surface-side opening portion 13a of the can main body 13 and then fixed by thermal welding.

In the top cover 14, terminal windows 14a, 14b, and 14c which are members that become a window frame portion for the plus terminal 12a, the minus terminal 12b, and the control terminal 12c and through which the plus terminal 12a, the minus terminal 12b, and the control terminal 12c are exposed to the outside are formed. Specifically, through the terminal window 14a, the plus terminal 12a is exposed to the outside. Through the terminal window 14b, the minus terminal 12b is exposed to the outside. Through the terminal window 14c, the control terminal 12c is exposed to the outside. The terminal windows 14a to 14c are opened to have a substantially rectangular shape, through which the terminals 12a to 12c are exposed to the outside. The terminal windows 14a to 14c have different sizes correspondingly to the different sizes of the terminals 12a to 12c as described above. That is, regarding the sizes of the terminals, the plus terminal 12a, the minus terminal 12b, and the control terminal 12c have substantially the same length in the thickness direction and the lengths thereof in the width direction are increased in an order of the control terminal 12c, the plus terminal 12a, and the minus terminal 12b. Corresponding to this, also regarding the sizes of the terminal windows 14a to 14c, the terminal window 14a, the terminal window 14b, and the terminal window 14c have substantially the same length in the thickness direction and the lengths thereof in the width direction are increased in an order of the terminal window 14c, the terminal window 14a, and the terminal window 14b.

Here, referring to FIGS. 6 to 7, each of sides of the terminal windows 14a to 14c formed to have a substantially rectangular shape will be described. Basically, in the sides of the terminal windows 14a to 14c, taper portions are formed to be inclined downwardly inward so that it becomes easy for the electrical contacts provided in the bottom surface of the battery attachment portion 111 of the digital still camera 100 to be inserted and brought into press-contact with the terminals 12a to 12c. In all four sides of the terminal window 14c through which the control terminal 12c is exposed to the outside, first taper portions 20a are formed. Further, regarding the terminal window 14a through which the plus terminal 12a is exposed to the outside, in one side close to the side surface 11f on the one end portion side of the pack main body 11, a second taper portion 20b steeper than the first taper portions 20a is formed and in the other three sides, first taper portions 20a are formed. Further, regarding the terminal window 14b through which the minus terminal 12b is exposed to the outside, a side on an opposite side to the side surface 11f on the one end portion side of the pack main body 11, a perpendicular wall portion 20c substantially perpendicular to the minus terminal 12b is formed and in the other three sides, first taper portions 20a are formed. It should be noted that a taper may be formed also in the perpendicular wall portion 20c, the taper having an inclination necessary for removing it from a mold in molding.

As described above, regarding the terminal windows 14a to 14c, by providing the sides on the upper surface 11a side and the lower surface 11b side of the pack main body 11 with the first taper portions 20a, it becomes easy for the electrical contacts of the battery attachment portion 111 to be brought into contact with the terminals 12a to 12c.

In addition, the battery pack 10 can be attached to a battery attachment portion of a different electronic apparatus other than the digital still camera 100. The positions of electrical contacts of a battery attachment portion of the different electronic apparatus are different in some extent from the positions of the electrical contacts of the battery attachment portion 111 of the digital still camera 100. Even in such a case, regarding the terminal windows 14a to 14c, except for the second taper portion 20b of the terminal window 14a for the plus terminal 12a and the perpendicular wall portion 20c of the terminal window 14b for the minus terminal 12b of the pack main body 11, the first taper portions 20a are formed in the sides in the width direction of the front surface 11c. Thus, even when attached to the battery attachment portion of the electronic apparatus different from the digital still camera 100, it is easy for the electrical contacts of the battery attachment portion 111 to be brought into contact with the terminals 12a to 12c. In other words, even if the positions of the electrical contacts of the different electronic apparatus are different from the positions of the electrical contacts of the digital still camera 100, it is easy for the electrical contacts of the battery attachment portion 111 to be brought into contact with the terminals 12a to 12c.

Additionally, one side, which is close to the side surface 11f on the one end portion side of the pack main body 11, of the terminal window 14a for the plus terminal 12a is located at the endmost on the front surface 11c of the pack main body 11. Therefore, in order to ensure a mechanical strength in the corner of the top cover 14, the second taper portion 20b steeper than the first taper portions 20a is formed. Thus, in the terminal window 14a for the plus terminal 12a, it is possible to realize a function of introducing the electrical contact of the battery attachment portion and at the same time to ensure a mechanical strength. It should be noted that the second taper portion 20b may be set to be a perpendicular wall portion if giving priority to a mechanical strength.

In addition, in some electronic apparatuses other than the digital still camera 100, in a center portion in a bottom portion of a battery attachment portion, in addition to the electrical contacts, an ejection spring formed of a coil spring or the like for ejecting the battery pack from the battery attachment portion can be provided. Regarding the terminal window 14b for the minus terminal 12b, the side on the opposite side to the side surface 11f on the one end portion side of the pack main body 11 is set to be the perpendicular wall portion 20c. The side on the opposite side to the side surface 11f on the one end portion side of the terminal window 14b for the minus terminal 12b is set to be not the taper portion but the perpendicular wall portion 20c, and hence the ejection spring abuts against the minus terminal 12b, which can prevent a short circuit from occurring.

Figure 6:
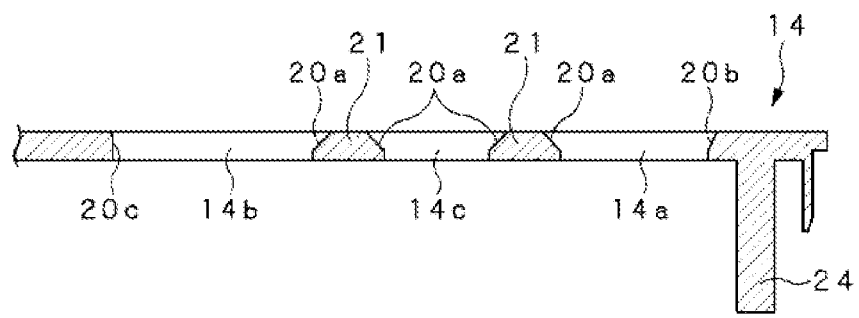
[FIG. 6] A cross-sectional view of a top cover.
Figure 7:
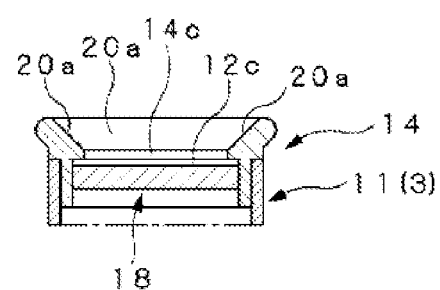
[FIG. 7] A cross-sectional view taken along the line A-A' of FIG. 5.

Further, as shown in FIGS. 6 to 7, between the terminal window 14a for the plus terminal 12a and the terminal window 14c for the control terminal 12c and between the terminal window 14c for the control terminal 12c and the terminal window 14b for the minus terminal 12b, partition portions 21 and 21 having the same width and height are formed. The partition portions 21 and 21 partition the terminal windows 14a to 14c.

Figure 8:
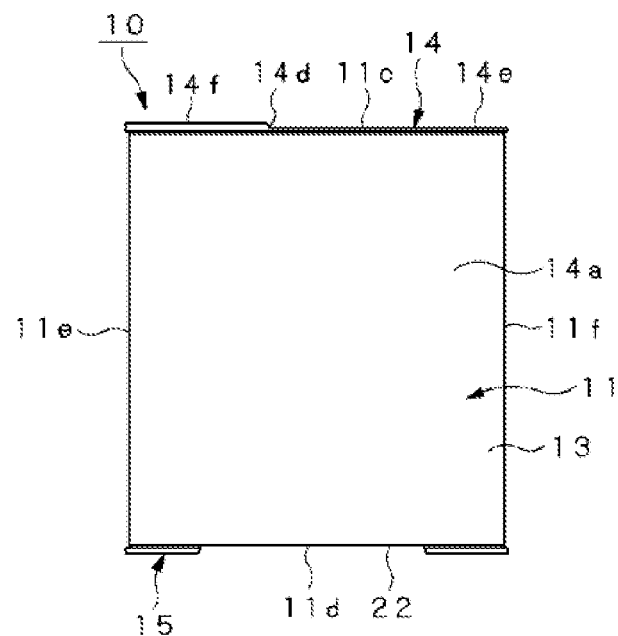
[FIG. 8] A plan view of the battery pack to which the present invention is applied.

Further, as shown in FIGS. 4, 5, and 8, in the top cover 14, a step portion 14d that separates the front surface 11c into two steps in the width direction is formed to be close to the side surface 11e being one end portion of the pack main body 11. The terminal windows 14a to 14c are formed in a lower surface 14e. As shown in FIGS. 4 and 5, of the wiring substrate 18 located in an inside of the top cover 14, on not only the surface of the holder 19 side, but also the surface on the top cover 14 side, the electronic components 18a are mounted. On the surface on the top cover 14 side of the wiring substrate 18, in a region corresponding to a higher surface 14f via the step portion 14e of the top cover 14, the electronic components 18a are mounted. In other words, the higher surface 14f forms between the top cover 14 and the wiring substrate 18 a space for arranging the electronic components 18a. It should be noted that FIG. 5 shows only the electronic components 18a mounted on the surface on the top cover 14 side of the wiring substrate 18.

Figure 9:
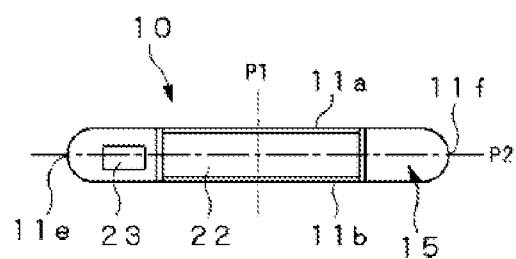
[FIG. 9] A back view of the battery pack to which the present invention is applied.

On the other hand, as shown in FIGS. 3 and 9, the back-surface-side opening portion 13b of the can main body 13 is closed with the bottom cover 15. The bottom cover 15 is formed of, for example, resin material such as polypropylene and fixed by thermal welding after fitted into the back-surface-side opening portion 13b of the can main body 13. In a center portion in the width direction of the bottom cover 15, a label attachment recess portion 22 is formed. Further, in the bottom cover 15, a positioning recess portion 23 is formed. To the positioning recess portion 23, the lock member 112, a positioning protrusion of a charger, or the like is engaged when one end portion of the bottom cover 15 is attached to the battery attachment portion 111. The positioning recess portion 23 is formed in a position slightly deviated to the lower surface 11b side of the pack main body 11 with respect to the centerline P2 in the thickness direction and deviated to the side surface 11f side of the pack main body 11 with respect to the centerline P1 in the width direction.

It should be noted that to the upper surface 11a and the lower surface 11b including the label attachment recess portion 22 of the pack main body 11, a label may be attached. When the label is attached to the pack main body 11, it is possible to prevent the bottom cover 15 from dropping out. Further, on the label, a "+" mark, a "T" mark, a "−" mark, and a "C" mark may be printed correspondingly to the positions of the terminal windows 14a to 14c and an arrow indicating an attachment direction of the battery pack 10 to the battery attachment portion may be printed. With this, it is possible to improve the usability of the battery pack 10.

(2-2) Assembly of Battery Pack

Figure 10:
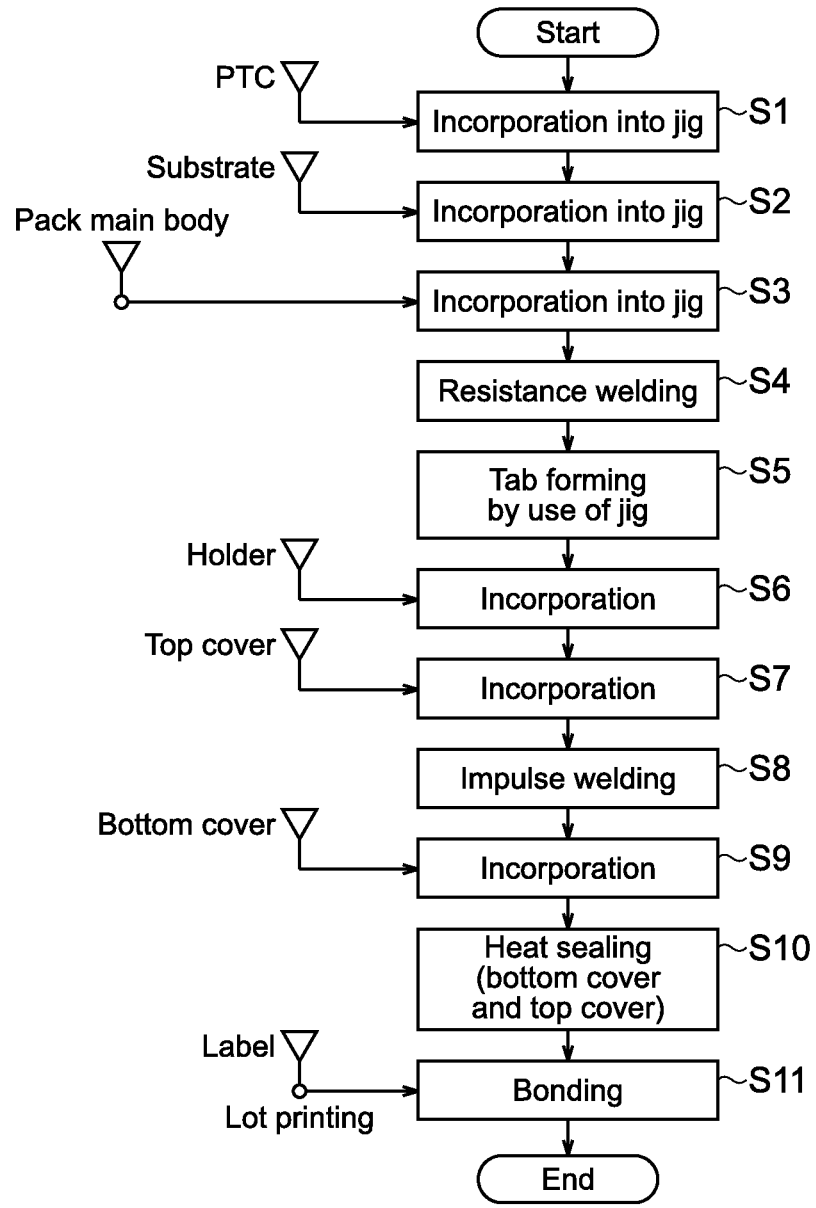
[FIG. 10] A flow chart of assembling the battery pack to which the present invention is applied.

Next, a method of assembling the battery pack 10 configured as described above will be described with reference to FIG. 10.

First, in Step S1, the PTC 18d to be attached to the wiring substrate 18 is incorporated in a jig. In Step S2, the wiring substrate 18 on which the electronic components 18a such as the protection element, the microcomputer, the FET element, a thermistor, and the like are mounted is incorporated in a jig. In Step S3, the pack main body 11 constituted of the can main body 13 in which the battery cell 29 is loaded and the lead terminals 16 and 17 are cut into a predetermined length is incorporated in a jig. After that, in Step S4, to the plus tab 18b of the wiring substrate 18, the plus lead terminal 16 introduced from the battery cell 29 is electrically connected by resistance welding or the like. Further, to the minus tab 18c of the wiring substrate 18, the minus lead terminal 17 introduced from the battery cell 29 is electrically connected by resistance welding or the like. In Step S5, the lead terminals 16 and 17 subjected to resistance welding are folded in a predetermined shape.

In Step S6, the wiring substrate 18 is incorporated in the holder 19. Further, in Step S7, the holder 19 is incorporated in the top cover 14. Then, in Step S8, the holder 19 and the top cover 14 are subjected to impulse welding and it is incorporated in the front-surface-side opening portion 13a of the can main body 13.

Figure 11:
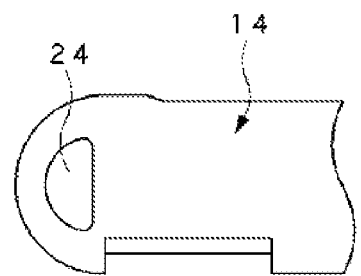
[FIG. 11] A plan view showing a rib for welding a top cover and a holder.

Here, as shown in FIGS. 3 and 11, the top cover 14 and the holder 19 are fixed by inserting into through-holes 19b formed on both sides of the holder 19 ribs 24 formed on both sides of the back surface of the top cover 14 and subjecting the ribs 24 to impulse welding. Recess portions 18e formed on both sides of the wiring substrate 18 are engaged to the ribs 24 of the top cover 14 between the top cover 14 and the holder 19.

Here, the ribs 24 and 24 on the both sides in the width direction of the back surface of the top cover 14 are formed to have a flat shape in an inside in a direction of the front surface 11c of the pack main body 11 and a circular arc shape on the side surfaces 11e and 11f side. Further, the ribs 24 and 24 are formed to have a substantially D-shaped cross-section. Further, the through-holes 19b and 19b formed on the both sides of the holder 19 are also formed to have a substantially D-shape correspondingly to the ribs 24 and 24. In other words, outer surfaces of the ribs 24 and 24 are formed to have a circular arc shape correspondingly to the fact that the both side surfaces 11e and 11f of the pack main body 11 have a circular arc shape and the both end portions in the width direction of the top cover 14 formed to have a circular arc shape correspondingly to the shape of the both side surfaces 11e and 11f. Thus, the ribs 24 and 24 can be formed to be closer to the both end portions in the width direction of the back surface of the top cover 14 while ensuring a mechanical strength. Thus, the space between the wiring substrate 18 and the top cover 14 can be correspondingly increased. With this, on the surface on the top cover 14 side of the wiring substrate 18, an increased number of electronic components 18a can be mounted.

In Step S9, in the back-surface-side opening portion 13b of the can main body 13, the bottom cover 15 is incorporated and the top cover 14 and the bottom cover 15 are, in Step S10, thermally welded to the can main body 13.

After that, in Step S11, a lot-printed label is supplied and attached onto the upper surface 11a, the back surface 11d, and the lower surface 11b of the pack main body 11 including the front-surface-side opening portion 13a and the back-surface-side opening portion 13b that are closed with the top cover 14 and the bottom cover 15. It should be noted that although the example in which the top cover 14 and the bottom cover 15 are formed as separate parts is shown herein, a frame formed to have a substantially rectangular shape so as to be capable of housing the pack main body 11 in its center portion may be attached to the pack main body 11. In this case, a front surface of the frame has the same shape as that of the above-mentioned top cover and a back surface of the frame has the same shape as that of the above-mentioned bottom cover.

(2-3) Action of Battery Pack

In the battery pack 10 assembled and configured as described above, the front surface 11c of the pack main body 11 provided with the terminal portion 12 is used as an insertion end into the battery attachment portion of the electronic apparatus. When the battery pack 10 is attached to a battery attachment portion of a compatible electronic apparatus, the terminals 12a to 12c are brought into contact with the plus, minus, and control electrical contacts for corresponding to them. The three terminals 12a to 12c of the battery pack 10 have different sizes as shown in FIG. 5 and the like. Specifically, in the battery pack 10, the three terminals 12a to 12c are formed to have sizes increased in an order of the control terminal 12c, the plus terminal 12a, and the minus terminal 12b. The positions and sizes of the three terminals 12a to 12c are set so that the three terminals 12a to 12c can be brought into contact with the electrical contacts of the battery attachment portion of the compatible electronic apparatus. With this, the terminals of the battery pack 10 can be brought into contact with not only the electrical contacts in the battery attachment portion 111 of the digital still camera 100 described above, but also electrical contacts in a battery attachment portion of a digital still camera of a different model. In addition, the terminals of the battery pack 10 can be also brought into contact with electrical contacts in a battery attachment portion of a different electronic apparatus. Thus, the battery pack 10 can be used as a power source for a plurality of electronic apparatuses.

In view of use of the battery pack 10, the battery pack 10 is formed such that the plus terminal 12a and the minus terminal 12b are larger than the control terminal 12c. Thus, in the battery pack 10, it becomes possible to realize multipoint contact between the plus terminal 12a and the minus terminal 12b and the electrical contacts and stable power supply and low resistance can be realized.

In addition, by setting the plus terminal 12a to be larger than the control terminal 12c and smaller than the minus terminal 12b, it is possible to prevent a short circuit in contact with the electronic apparatus and to ensure a sufficient mechanical strength on the side surface 11f side of the top cover 14. In addition, the side in the width direction of the terminal window 14a for the plus terminal 12a is formed to be steeper than the first taper portions 20a, and hence it is possible to realize introduction of the electrical contacts of the battery attachment portion 111 and at the same time to prevent the mechanical strength of the corner portion on the side surface 11f side of the pack main body 11 from being lowered. In addition, the side in the inside of the terminal window 14b for the minus terminal 12b is set to be the perpendicular wall portion 20c, and hence it is possible to prevent an ejection spring attached to an electronic apparatus other than the digital still camera 100 from being brought into contact with the minus terminal 12b, which leads to a short circuit. Further, regarding the terminal windows 14a to 14c, by providing the side on the upper surface 11a side and the lower surface 11b side of the pack main body 11 with the first taper portions 20a, it becomes possible that the electrical contacts of the battery attachment portion 111 of the digital still camera 100 or the other electronic apparatuses are easily brought into contact with the terminals 12a to 12c.

It should be noted that the front surface 11c and the back surface 11d of the pack main body 11 may be provided with a small recess portion, a protrusion portion, a groove, or the like for various purposes such as prevention of incorrect insertion or determination of the kind of a battery. Further, as the battery cell, it is not limited to the lithium-ion polymer secondary battery.

Description Of Reference Symbols 10 battery pack, 11 pack main body, 11a upper surface, 11b lower surface, 11c front surface, 11d back surface, 11e, 11f side surface, 12 terminal portion, 12a plus terminal, 12b minus terminal, 12c control terminal, 13 can main body, 13a front-surface-side opening portion, 13b back-surface-side opening portion, 14 top cover, 14a to 14c terminal window, 14d step portion, 14e lower surface, 14f higher surface, 15 bottom cover, 16 plus lead terminal, 17 minus lead terminal, 18 wiring substrate, 18a electronic component, 18b plus tab, 18c minus tab, 18e recess portion, 19 holder, 19a cutout, 19b through-hole, 20a first taper portion, 20b second taper portion, 20c perpendicular wall portion, 21, 21 partition portion, 22 label attachment recess portion, 23 positioning recess portion, 24 rib, 29 battery cell, 100 digital still camera, 101 camera main body, 107 battery insertion port, 108 battery lid, 111 battery attachment portion, 112 lock member

The invention claimed is:

1. A battery pack, comprising:
a window frame portion disposed on a first end side of a pack body and provided with terminal windows including a first terminal window through which a plus terminal of a terminal portion is exposed to an outside, a second terminal window through which a minus terminal of the terminal portion is exposed to the outside, and a third terminal window through which a communication terminal of the terminal portion is exposed to the outside;
wherein the terminal windows are deviated to a first side in a width direction in the window frame portion and are arranged in an order of the first terminal window, the third terminal window, and the second terminal window from the first side,
wherein a size of the third terminal window is smaller than each of the first and second terminal windows, and
wherein at least one of two side portions of the battery pack has at least one curved surface, the two side portions being disposed at the first side and at a second side of the battery pack opposite the first side.

2. The battery pack according to claim 1, wherein
the terminals are exposed to the outside through the terminal windows each having a substantially rectangular shape, and
each of the terminal windows is, at least in a side thereof in the width direction of the window frame portion, provided with a taper portion.

3. The battery pack according to claim 2, wherein
a side on the first terminal window on the first side and a side on the second terminal window on the second side are steeper than the other sides of the first and second terminal windows.

4. The battery pack according to claim 1, wherein
to a substrate portion to which a lead terminal of a battery cell is connected, a holder that holds the substrate portion, and the window frame portion to cover the substrate portion held by the holder are attached,
the window frame portion is provided with a rib to be integrated with the holder, and the rib has a flat portion in an inside of the battery pack and a curved surface opposite the flat surface.

5. The battery pack according to claim 1, wherein a distance between the first terminal window and the first side is shorter than a distance between the second terminal window and the second side.

6. The battery pack according to claim 1, wherein the plus terminal, the minus terminal, and the communication terminal are disposed along a line extending in the width direction.

7. The battery pack according to claim 1, wherein sizes of the plus terminal, the minus terminal, and the communication terminal are increased in an order of the communication terminal, the plus terminal, and the minus terminal.

8. The battery pack according to claim 1, wherein the first and the second terminal windows do not overlap with a mirror image of the first and the second terminal windows with respect to a center line in the width direction of the window frame portion.

9. The battery pack according to claim 1, wherein the first and the second terminal windows are arranged asymmetrically to each other with respect to a center line in the width direction of the window frame portion.

10. The battery pack according to claim 1, further comprising a second end portion disposed on a second end side of the pack body, opposite the first end side, the second end portion having a recess portion deviated to a first side in a width direction of the second end portion, the width direction being a direction in which the terminals are aligned.

11. The battery pack according to claim 10, wherein the recess portion is further deviated to a direction perpendicular to the width direction of the second end portion.

12. The battery pack according to claim 1, wherein an external shape of the battery pack is symmetrical with respect to a center line in the width direction of the window frame portion, as viewed from the first end side of the battery pack.

13. The battery pack according to claim 1, wherein the window frame portion covers the terminal portion.

14. The battery pack according to claim 10, wherein a thickness of the window frame portion in a longitudinal direction of the battery pack is greater than a thickness of the second end portion in the longitudinal direction.

15. The battery pack according to claim 1, wherein the window frame portion includes a first level portion deviated to the second side.

16. The battery pack according to claim 15, wherein the first, second, and third terminal windows are provided in the window frame portion between the first level portion and the first side.

17. The battery pack according to claim 16, wherein an area of a surface of the window frame portion between the first level portion and the second side is smaller than an area of a surface of the window frame portion between the first level portion and the first side.

18. The battery pack according to claim 10, wherein the second end portion includes second level portions.

19. The battery pack according to claim 18, wherein the recess portion is located in the second end portion between the second level portions and the second side.

20. The battery pack according to claim 18, wherein the second end portion comprises two level portions located on opposite sides of a center line in the width direction of the second end portion.

21. The battery pack according to claim 1, wherein the communication terminal comprises a terminal adapted to communicate with an electronic device to output information.

22. The battery pack according to claim 1, wherein the communication terminal comprises a terminal adapted for an electronic device to obtain information.

23. The battery pack according to claim 1, wherein the at least one curved surface comprises a substantially circular arc surface, and the side portions of the battery pack are substantially symmetric to each other.

24. The battery pack according to claim 1, wherein the at least one curved surface comprises a first curved surface connected with a first portion of the battery pack and a second curved surface connected with a second portion of the battery pack, the first and second portions being disposed on opposite sides of the battery pack.

25. The battery pack according to claim 24, wherein the pack body comprises the first portion, the second portion, and the side portions.

26. The battery pack of any of claims 1-4 and 5-25, wherein the terminal portion consists of the plus terminal, the minus terminal, and the communication terminal.

* * * * *